(Model.)
T. B. TURLEY.
ANIMAL TRAP.
No. 271,952. Patented Feb. 6, 1883.
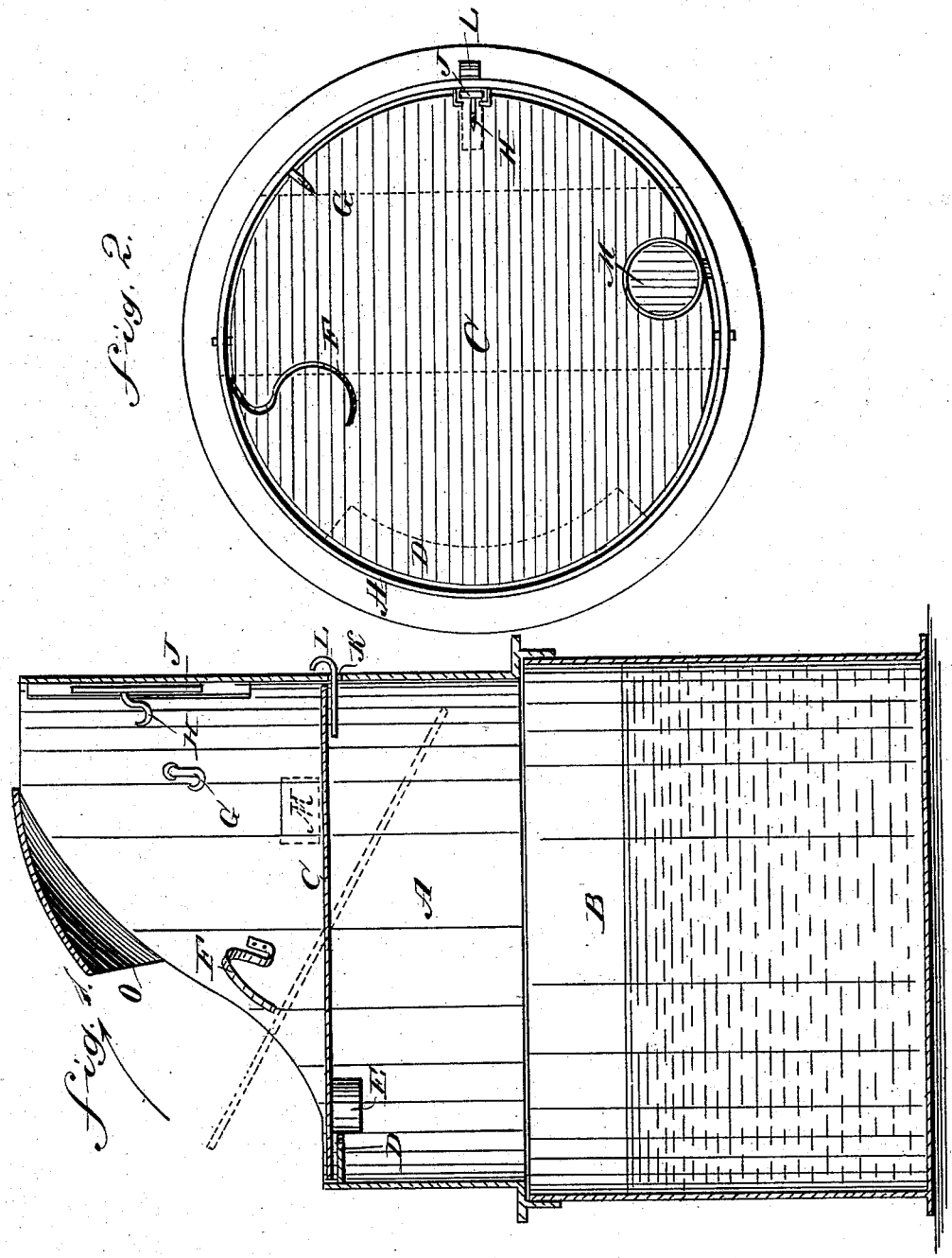
WITNESSES:
INVENTOR:
T. B. Turley
BY
ATTORNEYS.

UNITED STATES PATENT OFFICE.

TALTON B. TURLEY, OF LA MINE, MISSOURI.

ANIMAL-TRAP.

SPECIFICATION forming part of Letters Patent No. 271,952, dated February 6, 1883.

Application filed September 9, 1882. (Model.)

*To all whom it may concern:*

Be it known that I, TALTON B. TURLEY, of La Mine, in the county of Cooper and State of Missouri, have invented a new and Improved Animal-Trap, of which the following is a full, clear, and exact description.

The object of my invention is to produce an animal-trap which shall be automatic, resetting itself, or to be sprung and set by an attendant who waits and watches for the game; and it consists in the construction and combination of parts hereinafter described, and set forth in the claim.

Reference is to be had to the accompanying drawings, forming part of this specification, in which similar letters of reference indicate corresponding parts in both the figures.

Figure 1 is a cross-sectional view of my improved animal-trap. Fig. 2 is a plan view of the same with the top cross-piece omitted.

A cylindrical vessel, A, the upper edge of which rises from the rear to the front, rests upon a tank, B, which is filled with water. In the vessel A a platform, C, is pivoted in such a manner that it can swing up and down on the line from rear to front. At the rear of the vessel A the platform C rests on a projection, D, and is drawn downward by a weight, E, attached to its under side. A curved spring, F, is attached to the side of the vessel A, and when the platform C strikes against the said spring the same forces the platform down again.

On the inner surface of the raised part of the vessel A a bait-hook, G, is fastened, and an additional bait-hook, H, is attached to a vertical slide, J, fitted in a groove in the elevated side of the trap, to slide when the bait is pulled upon by the animal as he sinks downward with the swinging platform C, in order that he may not be startled and turn back until it is too late for him to get out.

Below the front end of the pivoted platform C the vessel A is provided with an aperture, K, through which a pin, L, is passed to support the front end of the platform, to prevent the platform from tilting. A small water-tank, M, is attached to the inner surface of the vessel A, the water in the said tank being also used as bait.

If an animal walks on the platform C to get at the bait on the hooks G and H, or in the tank M, it must step on the front end of the platform C, which tilts and precipitates the animal into the water in the tank B. The spring F throws the pivoted platform down again. The front part of the sides of the vessel A is raised to prevent the animals from running over the trap and from stealing the bait from the front. If the platform C is to be locked so that it cannot tilt, the pin L is pushed under it, as shown in Fig. 1. The animal can walk on the platform C, and when the trapper finds the animal engaged in devouring or tearing down the bait he can withdraw the pin L, upon which the platform C immediately swings down.

A curved cross-piece, O, is secured on the curved upper edges of the vessel A to prevent the animal from backing out of the trap after it has once entered. The cross-piece is high enough to let the animal enter, but when the platform tilts the end on which the rear of the animal rests comes near the edge of the cross-piece O, and thus prevents egress of the animal.

The trap can be made of metal or wood, of any desired size, and can be made circular, square, or oblong, as may be desired.

Having thus described my invention, I claim as new and desire to secure by Letters Patent—

The combination, with the open-bottomed trap-body A, placed over a vessel of water, B, of the tilting platform C and the vertically-sliding bait-hook H J, as and for the purpose specified.

T. B. TURLEY.

Witnesses:
LON. V. STEPHENS,
L. H. LEVENS.